Patented Mar. 21, 1933

1,902,773

UNITED STATES PATENT OFFICE

WILLIAM J. HALE, OF MIDLAND, MICHIGAN

METHOD OF PROTECTING GRANULES OF HYGROSCOPIC SUGARS AND ARTICLE PRODUCED THEREBY

No Drawing. Application filed March 25, 1930. Serial No. 438,911.

The hygroscopic nature of certain sugars such as levulose (d-fructose) and maltose, and sugars which by reason of slight impurities are hygroscopic, prevents general use in the arts in crystalline or solid state. The greater solubility of levulose, for example, as compared with other sugars in practically all solvents, renders it exceedingly difficult to directly coat the levulose granules by solutions of other sugars, followed by immediate evaporation of the volatile solvents. In fact, the assembly of particles of levulose and the other sugar, contiguous to one another as a result of such coating, is actually more hygroscopic than the levulose itself. Further, the deposit of a film from a solution of a crystalline compound does not assure continuity of the covering; and the gaps in the covering expose the hygroscopic particle to attack by atmospheric moisture. Further, it is essential that the coating material must be thoroughly soluble in water if the characteristic properties of the enclosed sugar granules are to be immediately available. The exceeding thinness of such films furthermore does not afford the required mechanical protection for handling of the granules in bulk.

It has now been found that not only may the levulose granules be protected against attack by atmospheric moisture, but an article may be produced which of itself has new and valuable characteristics.

The granules of levulose, for example, are, according to the present invention, given a thin superficial coating otherwise than by crystallization, so that the film thus produced extends uniformly over the entire surface of the granule. By "granule" will be understood a crystal or fragment of a crystal which may be of any normal size in commerce. Such coating or film forming materials may be of non-crystalline nature, or even of crystalline nature if care be taken to avoid the contact of a common solvent with the levulose for an extended period of time and under conditions facilitating the dissolution of the levulose in such solvent.

*Example I*

A glass tube ten feet in height and five inches in diameter is closed at its ends, and connected with a vacuum pump. A valved inlet for the sugar is provided at the top, and a similar valved outlet at the bottom. About five inches below the top, a number of small openings are provided leading to a duct into which is introduced a spray material. The tube is held at a temperature of 95 to 100° C. A charge of levulose granules is slowly delivered through the top inlet and allowed to fall downward in the tube. The spray duct is filled with a mixture of egg albumin and a little water. Under the vacuum, this spray mixture is delivered into the tube in the form of a very fine spray, and the levulose granules fall through it. As the granules continue in their movement downward in the tube they are completely dried, and may be removed at the bottom. The evacuation assists in the drying.

100 grams of levulose granules were found at the bottom to weigh about 100½ grams, indicating that only about ½ gram of egg albumin had been required to coat the surfaces of the levulose granules. The granules were not hygroscopic when exposed to the atmosphere.

The egg albumin of this example is a non-crystalline substance, and the levulose thus treated is provided with a very thin but continuous film of amorphous colloidal material. Such a material will be herein referred to as an "amorphoid" to indicate its lack of crystalline structure. Organic substances notably of the carbohydrate and protein types may be employed for this purpose, together with certain of their hydrolytic or decomposition products. Of the former type may be employed the pentosans inclusive of vegetable gum and gum substances such as arabin: while of the latter type, the albumins, globulins and possible proteins such as casein, and albuminoid substances such as gelatine may be employed. It will be noted that such substances may be employed in water solution, if the substance is immediately deposited from the water solution in a continuous film upon the levulose granule. Such substances are non-hygroscopic, water-soluble, physiologically-assimilable organic materials, and by reason of their amorphous nature are herein referred to as "amorphoids": a film thereof is deposited upon the levulose granule to insulate the levulose, so to speak, from the moisture of the atmosphere, and from the water or other solvent employed in the solution of dextrose which may be employed as hereinafter set forth.

*Example II*

100 grams of anhydrous levulose granules were subjected to dusting with an impalpable powder of dextrose monohydrate, and were thoroughly cooled in a refrigerator. The same tower tube was employed as in Example I, but the spray material was omitted and the duct closed. The heat of the tower is just sufficient to produce a fusion of the powdered dextrose monohydrate while the granules fall downward. The previous cooling of the granules makes possible a somewhat longer time of passage through the tower without difficulties, and a slightly higher degree of heat may be employed without deleterious effect (melting of the levulose M. P. 102–104° C.). The dextrose monohydrate melts at 95° C., although it somewhat softens at an even lower temperature (incipient fusion 86° C.). The fused dextrose monohydrate forms a continuous film over the individual levulose granules. The evacuation and temperature employed initiates the evolution of water from the dextrose monohydrate at 95° under normal pressure, and reaches a completion at 110° C.; under reduced pressure most of the water is removed under 100° C. The melting point of anhydrous dextrose (146° C.) is of course not attained.

The 100 grams of anhydrous levulose granules, as collected at the bottom of the tower, weighed 109 grams. The coated levulose granules were non-hygroscopic when exposed to the atmosphere.

The dextrose monohydrate may also be fused and employed as a spray as in Example I.

The thin film resultant in Example I, and the relatively thicker film from Example II, may be increased in thickness for mechanical or other reasons.

*Example III*

The protected granules of Example I were brought into contact with a syrup consisting of about 200 grams of anhydrous dextrose in about 150 grams of water, this solution being brought to the point of saturation at a temperature of 30 to 35° C. After stirring for fifteen to twenty minutes, the granules were filtered off and dried in vacuo. The total weight of dried crystalline granules amounted to 196.7 grams. Their composition therefore closely corresponded to that of invert sugar, since 100 parts of the total weight was levulose core material and 96.2 parts was dextrose coating. These granules, however, are hard crystalline bodies, not subject to absorption of moisture from the atmosphere, and having the levulose and dextrose physically segregated so that the levulose is present as the core and the dexthose as a continuous coating around the core: in distinction from the syrupy consistency of invert sugar in which the levulose and dextrose are uniformly distributed with respect to one another. The mass of these granules constitutes physically a potential "invert sugar", since upon maceration or solution they rapidly attain the physical and chemical characteristics of invert sugar, and cannot be differentiated therefrom.

The crystallization of anhydrous dextrose from the aqueous solution saturated with respect thereto may be facilitated by a brief dusting of the initially protected levulose granules by an impalpable powder of anhydrous dextrose.

The protected granules of Example II may be similarly treated with the production of a similar product.

This material is a non-hygroscopic granular sugar of clear color, and in its composition corresponding to ordinary invert sugar, but is a solid instead of a syrup. Obviously, any desired thickness of coating of dextrose may be prepared by regulating the time and temperature conditions, so that an even greater proportion of dextrose, for example, may be employed to produce a product corresponding to the well known mixture of cane sugar and dextrose as employed for making candy.

As both levulose and anhydrous dextrose crystallize in the same orthorhombic system (rhombic prisms) intramolecular crystalline growth is feasible, and the dextrose casing in crystallizing complements the levulose core.

The solvents or diluents employed for the spray materials need not be water, but should be relatively volatile so that they may be immediately removed by evaporation and will precipitate the coating material in a continuous film. Acetone serves admirably in many instances because of the extreme or almost total insolubility of levulose therein.

It is obvious that the invention is not limited to the forms of practicing and the materials set forth, but that these may be modified in many ways within the scope of the appended claims.

What I claim as new and desire to secure by Letters Patent is:

1. The process of protecting a hygroscopic carbohydrate from atmospheric moisture which comprises spraying the surfaces of the granules of the carbohydrate with a non-hygroscopic water-soluble carbohydrate to produce a continuous and completely enclosing film thereof, and increasing the thickness of such non-hygroscopic film by crystalline deposition thereon from a solution saturated with respect to the non-hygroscopic carbohydrate being deposited.

2. The process of protecting levulose from atmospheric moisture which comprises dusting the surfaces of the levulose granules with dextrose monohydrate, and heating the dextrose monohydrate to the fusing point whereby to form a continuous and completely enclosing film of dextrose around each of the individual granules of levulose.

3. Process as in claim 2, including the step of heating the dusted granules under vacuo and to a temperature sufficient to cause evolution of water from the dextrose monohydrate.

4. Process as in claim 2, including the step of chilling the levulose granules before the fusing of the dextrose coating thereon.

5. Process as in claim 2, including the step of placing the levulose granules having the fused dextrose coating thereon in a solution saturated with respect to anhydrous dextrose whereby to build up a crystalline deposit of anhydrous dextrose thereon.

6. The process of making stable dry granules containing levulose, which includes the step of spraying granules of levulose with fused dextrose monohydrate whereby to form a continuous and completely enclosing film of a non-hygroscopic form of dextrose around each of the individual granules of levulose.

7. The process as in claim 6, including the further steps of employing the coated granules as seed in a solution saturated with respect to anhydrous dextrose, and building up more anhydrous dextrose upon the exterior of the granules by crystalline deposition thereon.

8. The process of preparing stable dry granules containing levulose and dextrose, which comprises covering the surfaces of levulose particles with continuous and completely enclosing films of a non-hygroscopic water-soluble and physiologically assimilable organic material whereby to produce a film for initially protecting the levulose, and thereafter building up upon the coated particles a crystalline deposit of anhydrous dextrose by employing the coated particles as seed in a solution saturated with respect to anhydrous dextrose.

9. The process of protecting a hygroscopic carbohydrate from atmospheric moisture which comprises covering an individual granule of the carbohydrate with a thin, continuous and completely enclosing film of a non-hygroscopic water-soluble physiologically-assimilable organic amorphoid, and depositing upon such film a dry casing of non-hygroscopic carbohydrate by crystallizing from a solution saturated with respect to said non-hygroscopic carbohydrate.

10. The process of protecting levulose granules from atmospheric moisture which comprises spraying the granules in vacuo with a non-hygroscopic water-soluble physiologically-assimilable organic amorphoid, and then depositing anhydrous dextrose upon said amorphoid by crystallizing from a solution saturated with respect to anhydrous dextrose.

11. The process of protecting a hygroscopic carbohydrate from atmospheric moisture which comprises individually covering the surfaces of a granule of such carbohydrate with a continuous and completely enclosing film of a non-hygroscopic water soluble physiologically-assimilable organic amorphoid, and then depositing anhydrous dextrose upon said amorphoid by crystallizing from a solution saturated with respect to anhydrous dextrose.

12. The process of protecting a hygroscopic carbohydrate from atmospheric moisture, which comprises covering an individual granule of such carbohydrate with a continuous and completely enclosing film of non-hygroscopic water-soluble physiologically-assimilable organic amorphoid, placing the covered granule as seed in a solution saturated with respect to a non-hygroscopic carbohydrate, and building up by crystalline deposition a layer of said other carbohydrate around said film.

13. An article of manufacture comprising a composite granule having a core of crystalline levulose and a casing of crystalline dextrose separated by a thin continuous film of a non-hygroscopic water-soluble and physiologically-assimilable organic amorphoid.

In testimony whereof, I affix my signature.

WILLIAM J. HALE.